United States Patent
Chen et al.

(10) Patent No.: US 12,301,280 B2
(45) Date of Patent: May 13, 2025

(54) SPREAD SPECTRUM SWITCHING CONVERTER AND SPREAD SPECTRUM CONTROL METHOD THEREOF

(71) Applicant: Richtek Technology Corporation, Zhubei (TW)

(72) Inventors: Jung-Sheng Chen, Miaoli (TW); Chin-Yen Lin, Hsinchu (TW); Ching-Yu Chen, Hsinchu (TW); Ting-Jung Lo, Hsinchu (TW); Hsing-Shen Huang, Hsinchu (TW)

(73) Assignee: RICHTEK TECHNOLOGY CORPORATION, Zhubei (TW)

( * ) Notice: Subject to any disclaimer, the term of this patent is extended or adjusted under 35 U.S.C. 154(b) by 262 days.

(21) Appl. No.: 18/050,784

(22) Filed: Oct. 28, 2022

(65) Prior Publication Data
US 2023/0223987 A1 Jul. 13, 2023

Related U.S. Application Data

(60) Provisional application No. 63/299,129, filed on Jan. 13, 2022.

(30) Foreign Application Priority Data

Jul. 25, 2022 (TW) .................................. 111127839

(51) Int. Cl.
*H02M 1/44* (2007.01)
*H02M 1/00* (2006.01)
*H04B 1/717* (2011.01)

(52) U.S. Cl.
CPC ........ *H04B 1/7172* (2013.01); *H02M 1/0009* (2021.05); *H02M 1/0025* (2021.05); *H02M 1/44* (2013.01); *H04B 1/7174* (2013.01)

(58) Field of Classification Search
CPC ........ H02M 1/08; H02M 1/44; H02M 1/4225; H02M 1/0025; H02M 1/14; H02M 1/0003; H02M 3/156; H02M 3/158; H02M 3/157; H02M 3/33507; H02M 3/07; H02M 3/1584; H02M 3/155; H02M 3/1582; H02M 3/33546; H02M 3/28; H02M 3/33523; H02M 3/04; H02M 3/33592
See application file for complete search history.

(56) References Cited

U.S. PATENT DOCUMENTS

2015/0244269 A1* 8/2015 Yu ........................ H02M 3/156
324/284

* cited by examiner

*Primary Examiner* — Bryan R Perez
(74) *Attorney, Agent, or Firm* — Tung & Associates

(57) ABSTRACT

A spread spectrum switching converter converts an input power to an output power. The spread spectrum switching converter includes a pulse width modulation (PWM) circuit and a pulse omission control circuit. The PWM circuit generate an initial PWM signal according to a feedback signal related to the output power. The initial PWM signal controls at least one switch to switch an inductor to generate the output power. The pulse omission control circuit generates a pulse omission control signal to mask a portion of pulses of the initial PWM signal, to thereby generate an adjusted PWM signal. The pulse omission control circuit randomly adjusts the pulse width of the pulse omission control signal according to a random control signal, such that the adjusted PWM signal has a spread spectrum characteristic.

18 Claims, 13 Drawing Sheets

SPREAD SPECTRUM SWITCHING CONVERTER AND SPREAD SPECTRUM CONTROL METHOD THEREOF

CROSS REFERENCE

The present invention claims priority to U.S. 63/299,129 filed on Jan. 13, 2022 and claims priority to TW 111127839 filed on Jul. 25, 2022.

BACKGROUND OF THE INVENTION

Field of Invention

The present invention relates to a switching converter; particularly, it relates to a spread spectrum switching converter capable of spreading its frequency spectrum. The present invention also relates to a spread spectrum control method.

Description of Related Art

Please refer to FIG. 1A, which shows a schematic diagram of a conventional switching converter (i.e., switching converter 1000). As shown in FIG. 1A, the switching converter 1000 converts an input power VIN to an output power VOUT by switching an inductor L1, wherein the output power VOUT is supplied to a load ILOAD. An amplifier circuit 10 generates an error amplification signal VEA according to a feedback signal VF1 related to the output power VOUT. A comparator 20 compares a ramp signal VRA with the error amplification signal VEA, so as to generate an initial signal VCO. In a light load operation state, a comparator 30 compares the error amplification signal VEA with an omission reference signal VRP, to generate an omission control signal VPS. An omission control circuit 40 omits a portion of the pulses of the initial signal VCO according to the omission control signal VPS, to generate a modulation signal VPW. A driver 50 generates a driving signal HS and a driving signal LS according to the modulation signal VPW, to control a switch SWH and a switch SWL, respectively, so as to switch the inductor L1.

Please refer to FIG. 1B, which illustrates a signal waveform diagram depicting the operation of the conventional switching converter of FIG. 1A. The initial signal VCO is a periodic pulse signal. The omission reference signal VRP is a constant. The omission control signal VPS generated by the comparator 30 is a periodic pulse signal. The initial signal VCO is periodically omitted during the period (i.e., omission period TS1) wherein the omission control signal VPS is ON, so as to generate the modulation signal VPW. As a result, the modulation signal VPW is also a periodic pulse signal, and the output power VOUT generated by switching the inductor L1 via the driving signal HS and the driving signal LS is also a periodic pulse signal.

The prior art shown in FIG. 1A and FIG. 1B has the following drawback. Because the error amplification signal VEA and the omission reference signal VRP are both periodic pulse signals, the omission control signal VPS generated by the comparator 30 is also a periodic pulse signal, and the output power VOUT is also a periodic pulse signal. In a light load operation state, although the modulation signal VPW generated by the omission control circuit 40 which omits a portion of the pulses of the initial signal VCO can improve power utilization efficiency, the frequency spectrum of the modulation signal VPW and the frequency spectrum of the output power VOUT will have obvious major frequencies, and such major frequencies are generated periodically. Consequently and undesirably, such obvious periodic major frequencies will cause noise interference to the load ILOAD.

As compared to the prior art, the spread spectrum switching converter of the present invention is advantageous in that: in a light load operation state, the spread spectrum switching converter of the present invention can randomly adjust the error amplification signal, the omission reference signal or a delay time of the omission control signal, so as to randomly adjust the pulse width of the omission control signal, such that the modulation signal VPW and the output power VOUT both have a spread spectrum characteristic. That is, the present invention can broaden the bandwidth of the frequency spectrum of the modulation signal VPW and the output power VOUT, whereby unwanted periodic major frequency is suppressed, so that the issues of noise interference, electromagnetic interference (EMI) and electromagnetic radiation (EMR) which occur in the prior art due to pulse omission are significantly improved. Besides, because the present invention performs random adjustment according to an inverted-phase signal of the modulation signal VPW, the modulation signal VPW is not subject to interferences.

SUMMARY OF THE INVENTION

From one perspective, the present invention provides a spread spectrum switching converter, which is configured to operably switch at least one switch thereof according to a control signal, so as to convert an input power to an output power; the spread spectrum switching converter comprising: a pulse width modulation (PWM) circuit, which is configured to operably generate an initial PWM signal according to a feedback signal related to the output power by performing pulse width modulation; and a pulse omission control circuit, which is configured to operably generate a pulse omission control signal, wherein the pulse omission control circuit is configured to operably mask a portion of pulses of the initial PWM signal according to the pulse omission control signal, thus generating an adjusted PWM signal, to thereby generate the control signal;

wherein the pulse omission control circuit is configured to randomly adjust a pulse width of the pulse omission control signal according to a random control signal, such that the adjusted PWM signal has a spread spectrum characteristic.

In one embodiment, the pulse omission control circuit includes: a comparator, which is configured to operably compare an error amplification signal with a pulse omission reference signal to generate the pulse omission control signal, wherein the error amplification signal is generated by an error amplification circuit according to the feedback signal and wherein the initial PWM signal is generated according to the error amplification signal; wherein the random control signal is configured to randomly adjust a level of the error amplification signal, a level of the pulse omission reference signal or a delay time of the pulse omission control signal, so as to randomly adjust the pulse width of the pulse omission control signal.

In one embodiment, the level of the error amplification signal is correlated with an output current of the output power, wherein when the output current is lower than a current threshold, the pulse omission control signal starts generating an omission pulse for masking the portion of the pulses of the initial PWM signal, wherein the pulse omission reference signal is correlated with the current threshold.

In one embodiment, the PWM circuit is configured to operably compare a ramp signal with the error amplification signal, so as to generate the initial PWM signal, wherein the ramp signal is generated according to the output current.

In one embodiment, the pulse omission control circuit further includes: a random signal generation circuit, which is configured to operably trigger r the random control signal according to an inverted-phase signal of the adjusted PWM signal.

In one embodiment, the random signal generation circuit includes: a linear feedback shift register (LFSR), which is configured to operably trigger the random control signal according to the inverted-phase signal of the adjusted PWM signal.

In one embodiment, the pulse omission control circuit further includes: an adjustable current source circuit, which is configured to operably generate a random current according to the random control signal, so as to randomly adjust the level of the error amplification signal or the level of the pulse omission reference signal, thus randomly adjusting the pulse width of the pulse omission control signal.

In one embodiment, the pulse omission control circuit further includes: an adjustable delay circuit providing an adjustable delay time, wherein the adjustable delay circuit is configured to randomly adjust the adjustable delay time according to the random control signal, so as to randomly adjust the pulse width of the pulse omission control signal.

In embodiment, the spread spectrum switching converter further comprises: a power stage circuit including the at least one switch and an inductor which are coupled to each other, wherein the at least one switch is configured to operate the inductor according to the control signal, to convert the input power to the output power.

In one embodiment, the power stage circuit includes a boost converter, wherein the inverted-phase signal is generated by executing an inverted-phase operation on the adjusted PWM signal, wherein the adjusted PWM signal is configured to operably generate the control signal for operating an upper gate switch of the at least one switch.

From another perspective, the present invention provides a spread spectrum control method, which is configured to operably control a spread spectrum switching converter, wherein the spread spectrum switching converter is configured to operably switch at least one switch thereof according to a control signal, to convert an input power to an output power; the spread spectrum control method comprising: modulating a pulse width according to a feedback signal related to the output power, to generate an initial pulse width modulation (PWM) signal, so as to control the at least one switch to switch an inductor to generate the output power; generating a pulse omission control signal, wherein the pulse omission control signal is configured to operably mask a portion of pulses of the initial PWM signal according to the pulse omission control signal, so as to generating an adjusted PWM signal; and randomly adjusting a pulse width of the pulse omission control signal according to a random control signal, such that the adjusted PWM signal has a spread spectrum characteristic.

In one embodiment, the step for generating the pulse omission control signal includes: comparing an error amplification signal with a pulse omission reference signal, so as to generate the pulse omission control signal, wherein the error amplification signal is generated by an error amplification circuit according to the feedback signal and wherein the initial PWM signal is generated according to the error amplification signal; wherein the random control signal is configured to randomly a level of the error amplification signal, a level of the pulse omission reference signal or a delay time of the pulse omission control signal, so as to randomly adjust the pulse width of the pulse omission control signal.

In one embodiment, the level of the error amplification signal is correlated with an output current of the output power, wherein when the output current is lower than a current threshold, the pulse omission control signal starts generating an omission pulse for masking the portion of the pulses of the initial PWM signal, and wherein the pulse omission reference signal is correlated with the current threshold.

In one embodiment, the step for generating the initial PWM signal includes: comparing a ramp signal with the error amplification signal, so as to generate the initial PWM signal, wherein the ramp signal is generated according to the output current.

In one embodiment, the spread spectrum control method further comprises: triggering the random control signal according to an inverted-phase signal of the adjusted PWM signal.

In one embodiment, the step for randomly adjusting the pulse width of the pulse omission control signal according to a random control signal includes: generating a random current according to the random control signal, so as to randomly adjust the level of the error amplification signal or the level of the pulse omission reference signal, thus randomly adjusting the pulse width of the pulse omission control signal.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1A:
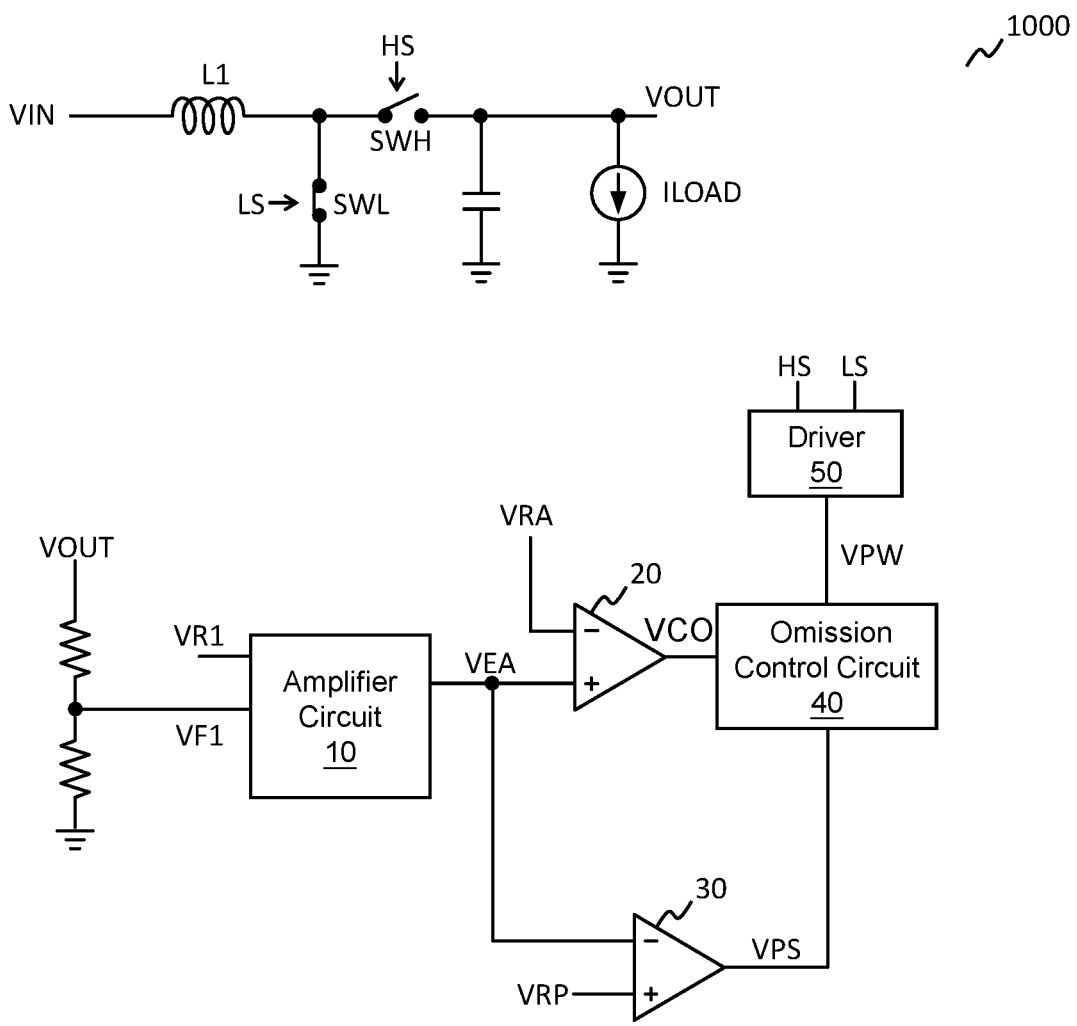
FIG. 1A shows a schematic diagram of a conventional switching converter.
Figure 1B:
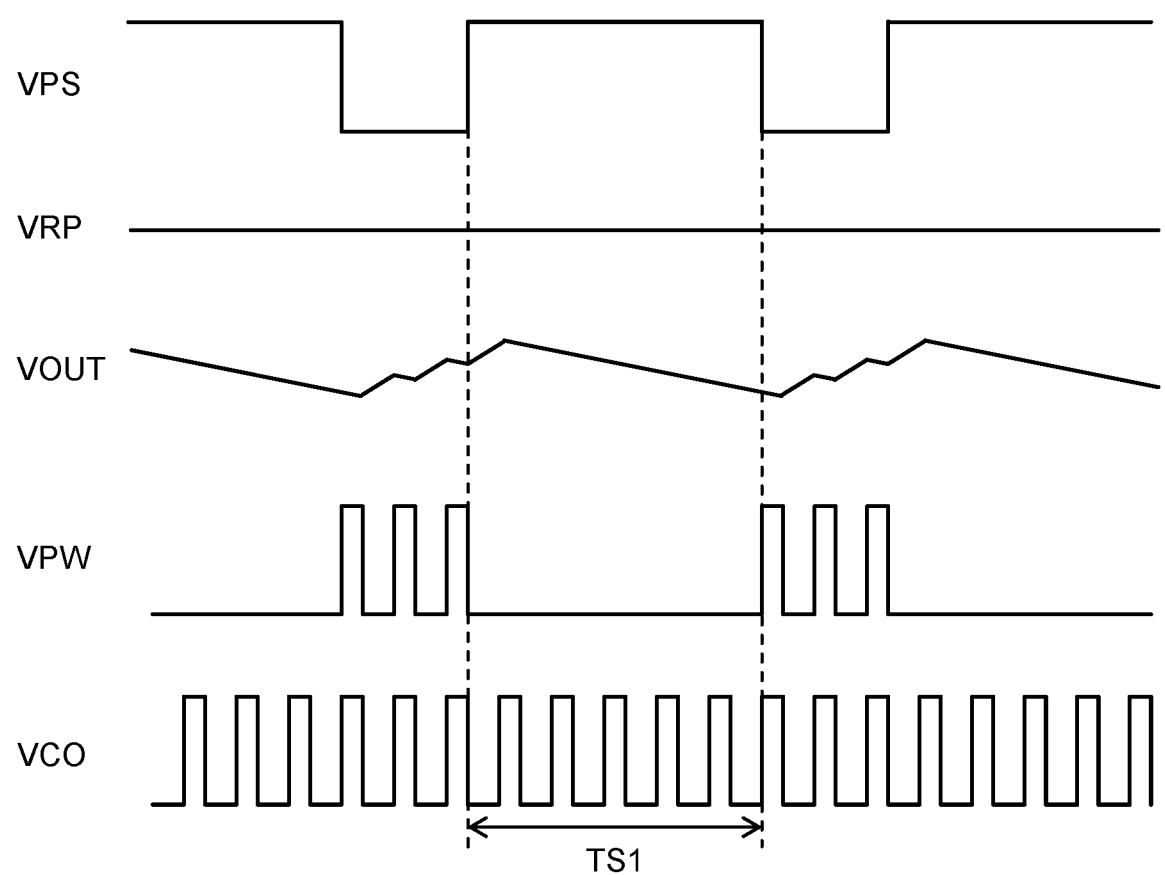
FIG. 1B illustrates a signal waveform diagram depicting the operation of the conventional switching converter of FIG. 1A.
Figure 2:
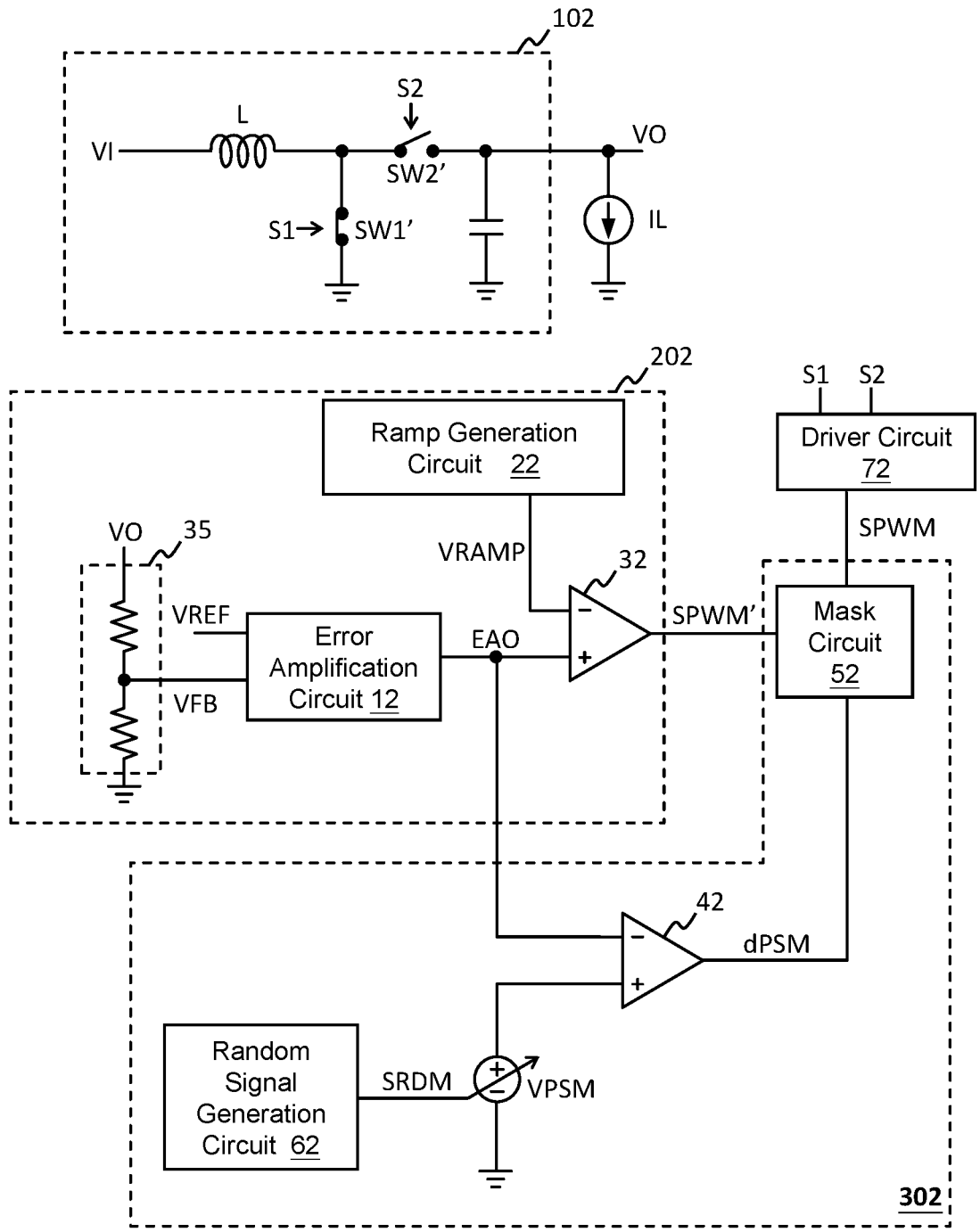
FIG. 2 shows a schematic diagram of a spread spectrum switching converter according to an embodiment of the present invention.

Please refer to FIG. 2, which shows a schematic diagram of a spread spectrum switching converter (i.e., spread spectrum switching converter 2002) according to an embodiment of the present invention. The spread spectrum switching converter 2002 is configured to operably convert an input power VI to an output power VO. In one embodiment, the spread spectrum switching converter 2002 comprises: a power stage circuit 102, a pulse width modulation (PWM) circuit 202 and a pulse omission control circuit 302. The PWM circuit 202 is configured to operably modulate a pulse width according to a feedback signal VFB related to the output power VO, so as to generate an initial PWM signal SPWM'. In one embodiment, the PWM circuit 202 includes: a voltage-divider circuit 35, an error amplification circuit 12, a ramp generation circuit 22 and a comparator 32. In one embodiment, the output power VO generates the feedback signal VFB via the voltage-divider circuit 35. The error amplification circuit 12 is configured to operably generate an error amplification signal EAO according to a reference signal VREF and the feedback signal VFB. The comparator 32 is configured to operably compare a ramp signal VRAMP generated by the ramp generation circuit 22 with the error amplification signal EAO, so as to generate the initial PWM signal SPWM'.

In one embodiment, the initial PWM signal SPWM' is processed by the pulse omission control circuit 302 to generate an adjusted PWM signal SPWM. A driver circuit 72 generates control signals S1 and S2, to control switches SW1' and SW2' respectively, so as to operate an inductor L to generate the output power VO, wherein the generated the output power VO is supplied to a load IL.

In one embodiment, as shown in FIG. 2, the pulse omission control circuit includes: a comparator 42 and a mask circuit 52.

In one embodiment, in a light load operation state, the comparator 42 is configured to operably compare an error amplification signal EAO with a pulse omission reference signal VPSM, so as to generate a pulse omission control signal dPSM. The mask circuit 52 is configured to operably mask a portion of pulses of the initial PWM signal SPWM' according to the pulse omission control signal dPSM, thus generating the adjusted PWM signal SPWM. In one embodiment, the pulse omission control circuit 302 further includes: a random signal generation circuit 62, which is configured to operably trigger a random control signal SRDM according to an inverted-phase signal of the adjusted PWM signal, to randomly adjust the pulse width of the pulse omission control signal dPSM, such that the adjusted PWM signal SPWM has a spread spectrum characteristic and to thereby avoid generating unwanted noise interferences which can affect the operation of the load IL coupled to the output power VO.

Figure 3:
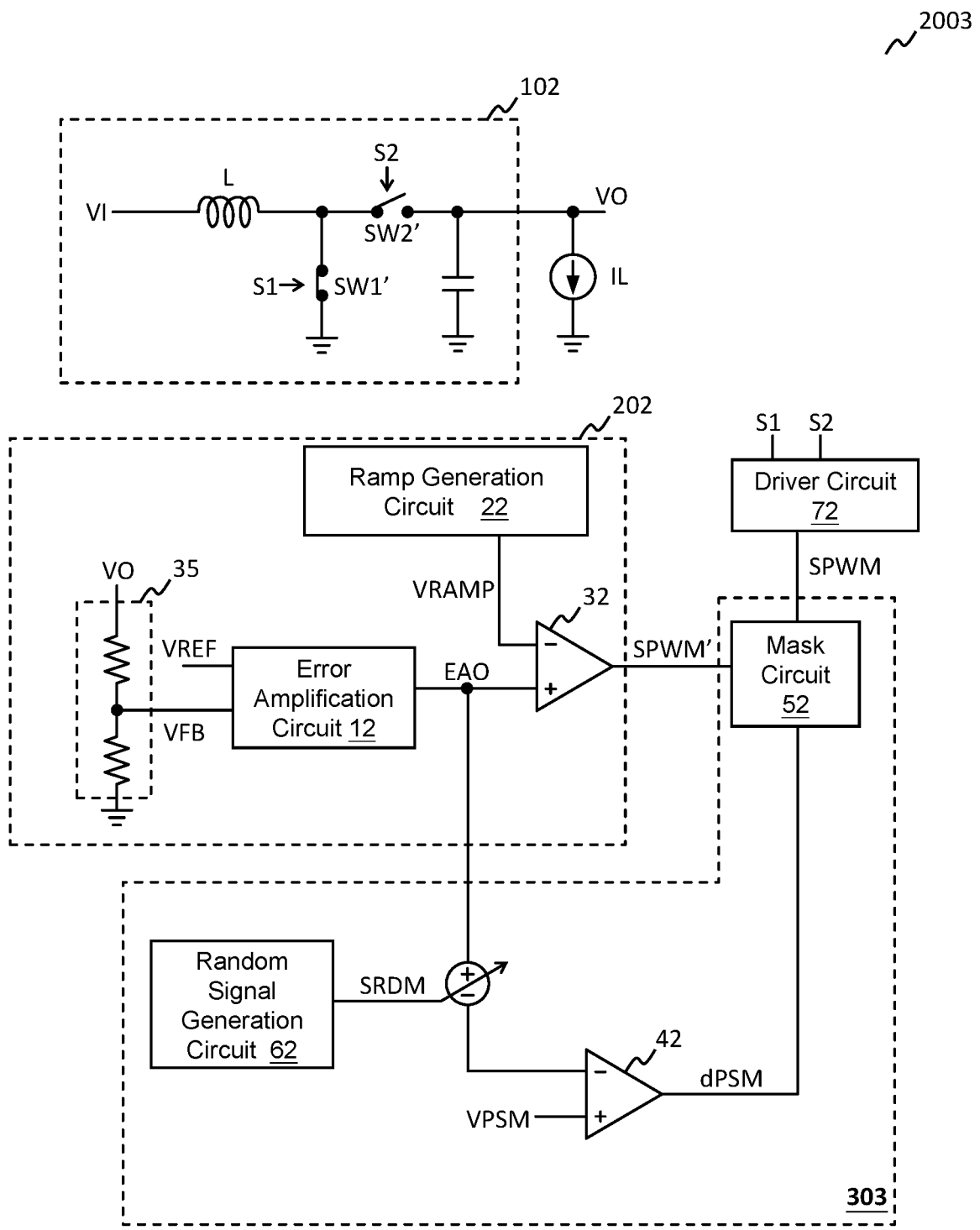
FIG. 3 shows a schematic diagram of a spread spectrum switching converter according to an embodiment of the present invention.
Figure 4:
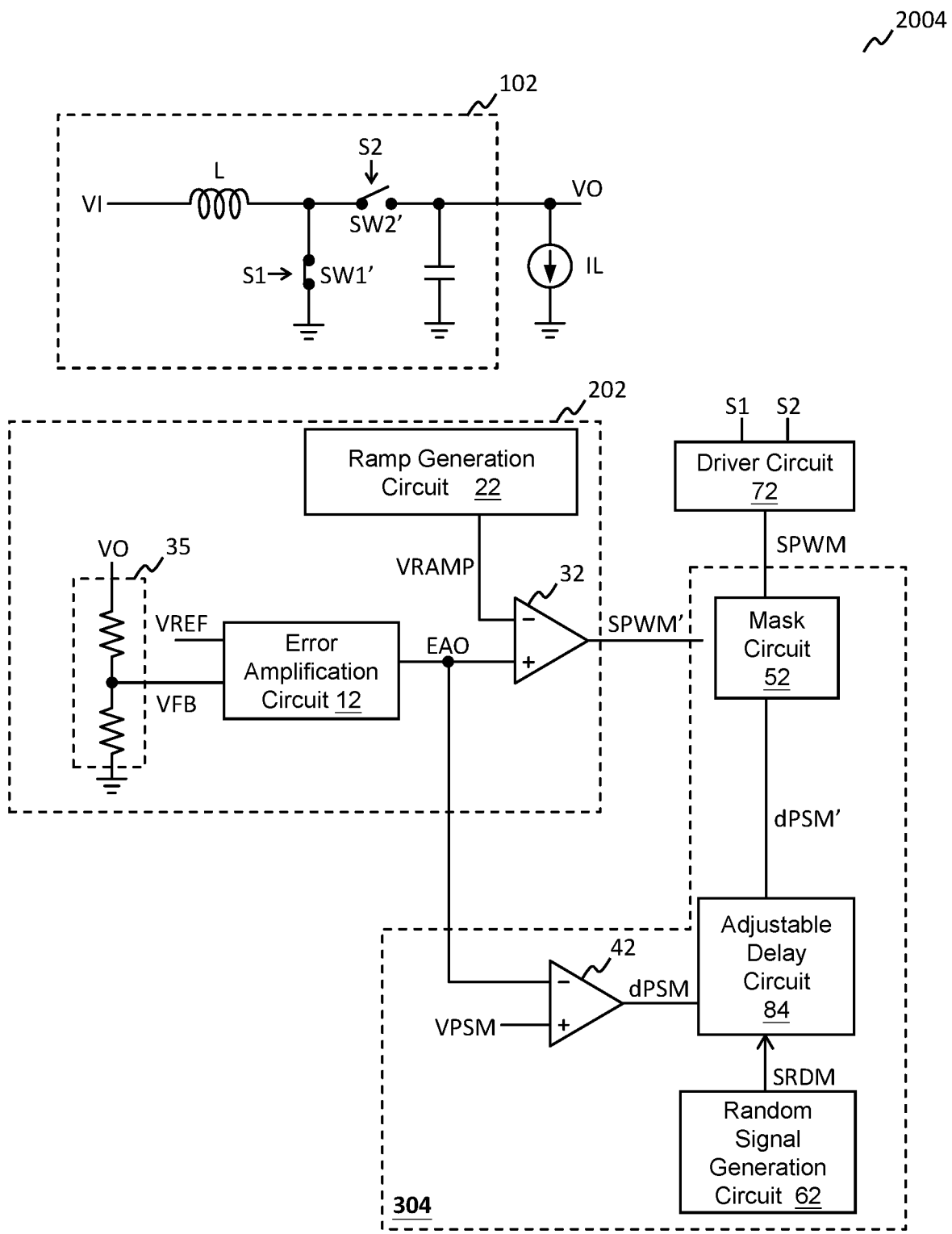
FIG. 4 shows a schematic diagram of a spread spectrum switching converter according to an embodiment of the present invention.

Please refer to FIG. 2 in conjugation with FIG. 3 and FIG. 4. FIG. 3 shows a schematic diagram of a spread spectrum switching converter (i.e., spread spectrum switching converter 2003) according to an embodiment of the present invention. FIG. 4 shows a schematic diagram of a spread spectrum switching converter (i.e., spread spectrum switching converter 2004) according to an embodiment of the present invention. The spread spectrum switching converter 2003 of FIG. 3 and the spread spectrum switching converter 2004 of FIG. 4 are similar to the spread spectrum switching converter 2002 of FIG. 2. In one embodiment, the random control signal SRDM generated by the random signal generation circuit 62 can randomly adjust a pulse width of the pulse omission control signal dPSM through one of three following approaches:

(1) As shown in FIG. 2, the random control signal SRDM randomly adjusts a level of the pulse omission reference signal VPSM, such that the pulse width of the pulse omission control signal dPSM is randomly adjusted;

(2) As shown in FIG. 3, in a pulse omission control circuit 303 of FIG. 3, the random control signal SRDM randomly adjusts a level of the error amplification signal EAO, such that the pulse width of the pulse omission control signal dPSM is randomly adjusted; and/or (3) As shown in FIG. 4, a pulse omission control circuit 304 of FIG. 4 further includes an adjustable delay circuit 84, wherein the adjustable delay circuit 84 provides a delay time which is adjustable according to the random control signal SRDM, so as to randomly adjust the pulse width of the pulse omission control signal dPSM, thus generating the adjusted pulse omission control signal dPSM'.

The following description will explain the embodiment of FIG. 2 by a signal waveform diagram (i.e., FIG. 5); the embodiment of FIG. 3 and the embodiment of FIG. 4 are similar to the embodiment of FIG. 2 and therefore the detailed signal waveform diagrams thereof are not redundantly shown here.

Figure 5:
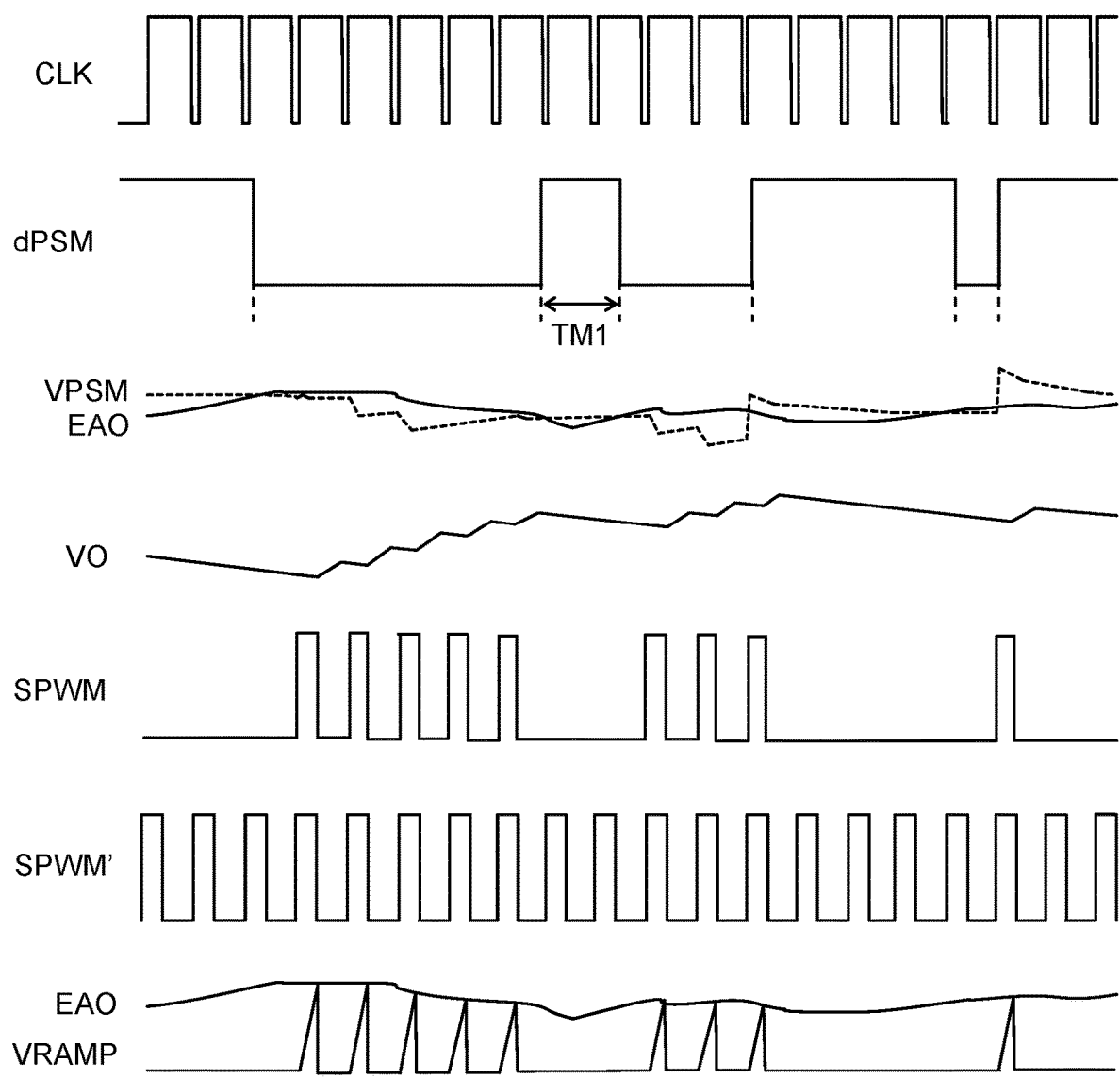
FIG. 5 illustrates a signal waveform diagram depicting the operation of a spread spectrum switching converter of FIG. 2.

Please refer to FIG. 2 in conjugation with FIG. 5. FIG. 5 illustrates a signal waveform diagram depicting the operation of the spread spectrum switching converter of FIG. 2. As shown in FIG. 5, the initial PWM signal SPWM' is a periodic pulse signal; the error amplification signal EAO is indicated by a solid line shown in the third waveform of the signal waveform diagram; the pulse omission reference signal VPSM is indicated by a dashed line shown in the third waveform of the signal waveform diagram. In one embodiment, when a comparison result of the comparator 42 indicates that the error amplification signal EAO is smaller than the pulse omission reference signal VPSM (e.g., during a mask period TM1 shown in FIG. 5), the pulse omission control signal dPSM generates an omission pulse for masking a portion of the pulses of the initial PWM signal SPWM'. Because the pulse omission reference signal VPSM is randomly adjusted according to the random control signal SRDM, the pulse omission control signal dPSM generates omission pulses randomly and the pulses of the initial PWM signal SPWM' are randomly masked, such that the adjusted PWM signal SPWM does not have a periodic pattern with a constant frequency, whereby the output power VO also does not have a periodic pattern with a constant frequency, so that the frequency spectrum of the adjusted PWM signal SPWM and the frequency spectrum of the output power VO both have a spread spectrum characteristic. Such spread spectrum characteristic can avoid generating unwanted noise interferences which can affect the operation of the load IL coupled to the output power VO.

Figure 6:
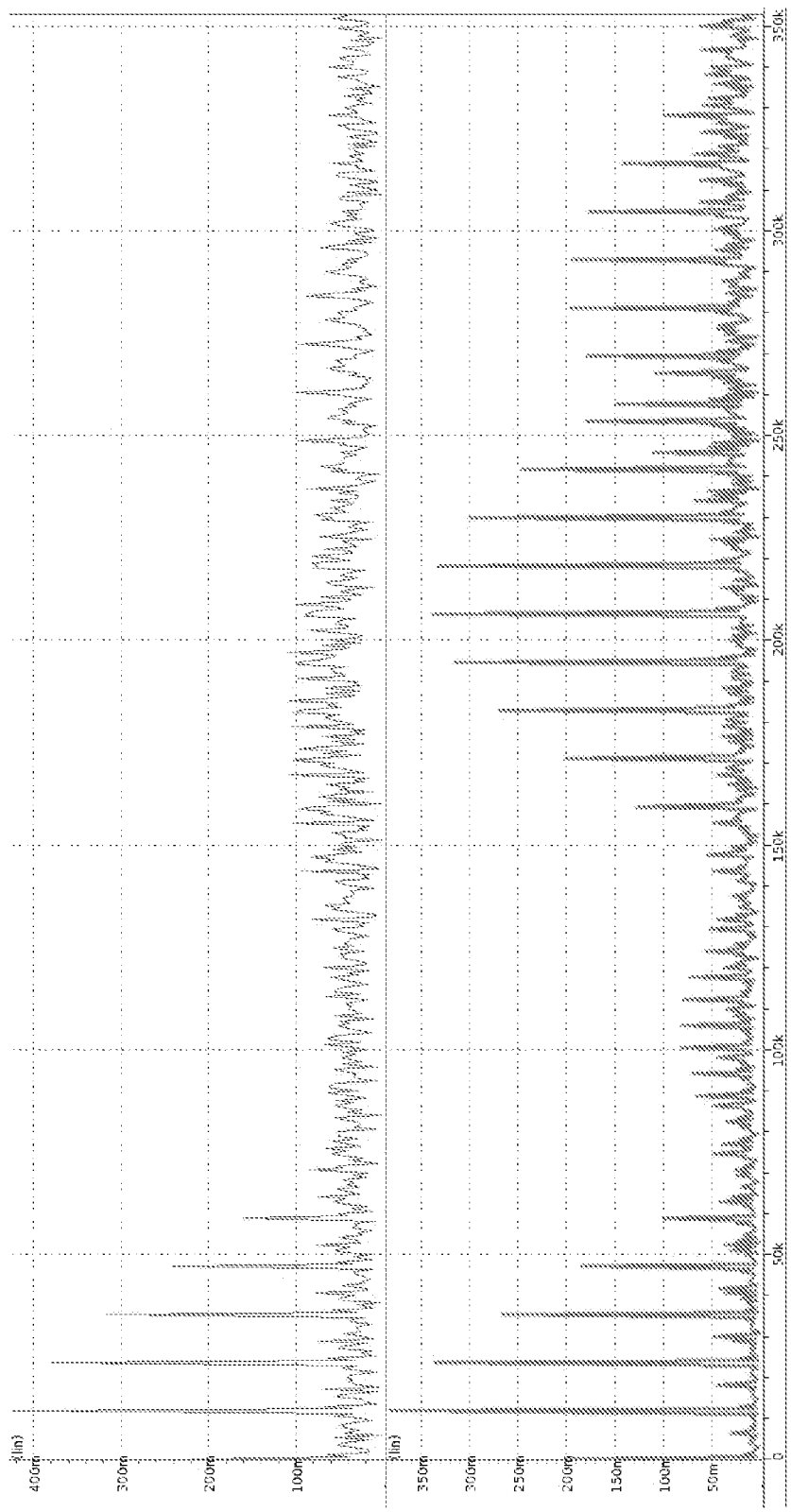
FIG. 6 is a comparison diagram illustrating an output power frequency spectrum processed by a spread spectrum switching converter of the present invention and an output power frequency spectrum which is not processed by a spread spectrum switching converter of the present invention.

Please refer to FIG. 6, which is a comparison diagram illustrating an output power frequency spectrum processed by a spread spectrum switching converter of the present invention and an output power frequency spectrum which is not processed by a spread spectrum switching converter of the present invention. As shown by the lower portion of the frequency spectrum in FIG. 6, in a case where the frequency spectrum of the output power VO is not processed by the spread spectrum switching converter of the present invention, the output power VO has obvious major frequencies, which will lead to a large noise interference for the load. On the contrary, as shown by the upper portion of the frequency spectrum in FIG. 6, in a case where the frequency spectrum of the output power VO has been processed by the spread spectrum switching converter of the present invention, the output power VO has a spread spectrum characteristic (i.e., as shown in FIG. 6, there is no major frequency and the spectrum is evenly distributed). The frequencies have been spread widely to avoid generating unwanted noise interferences which can affect the operation of the load IL coupled to the output power VO.

Figure 7:
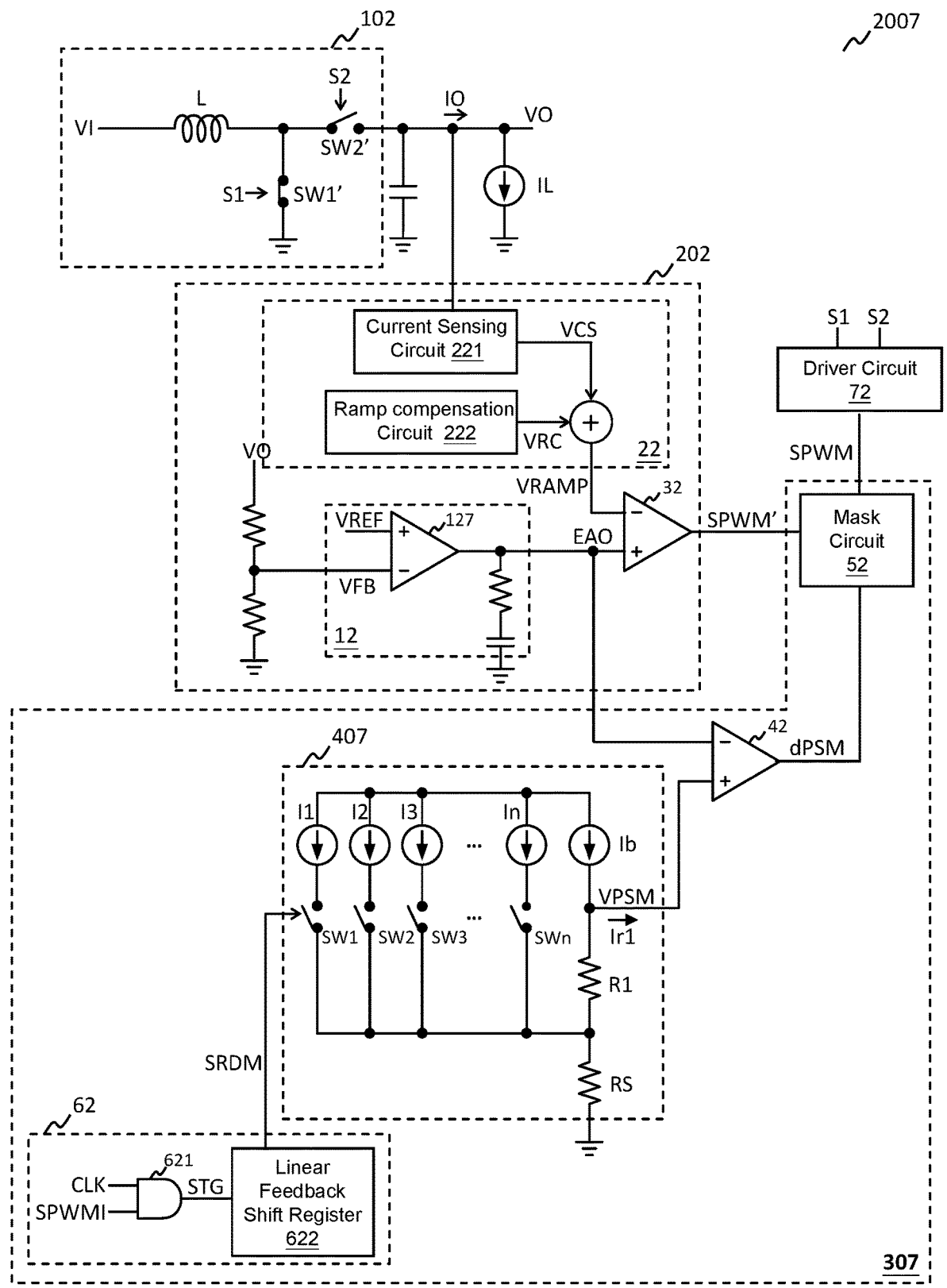
FIG. 7 shows a schematic diagram of a spread spectrum switching converter according to a specific embodiment of the present invention.

Please refer to FIG. 7, which shows a schematic diagram of a spread spectrum switching converter (i.e., spread spectrum switching converter 2007) according to a specific embodiment of the present invention. The spread spectrum switching converter 2007 of this embodiment shown in FIG. 7 is similar to the spread spectrum switching converter 2002 of the embodiment shown in FIG. 2, but is more specific in that, in this embodiment, the ramp generation circuit 22 includes a current sensing circuit 221 and a ramp compensation circuit 222; the error amplifier 12 includes an amplifier 127; the pulse omission control circuit 307 further includes an adjustable current source circuit 407; and the random signal generation circuit 62 includes an AND gate 621 and a linear feedback shift register (LFSR) 622.

As shown in FIG. 7, in one embodiment, the current sensing circuit 221 generates a current sensing signal VCS according to an output current IO of the output power VO. The ramp compensation circuit 222 generates a ramp compensation signal VRC. The current sensing signal VCS is linearly added with the ramp compensation signal VRC to generate the ramp signal VRAMP. Please refer to FIG. 7 in conjugation with FIG. 5. In this embodiment, the level of the error amplification signal EAO is correlated with the output current IO; when the output current IO is lower than a current threshold, the pulse omission control signal dPSM starts generating an omission pulse for masking the portion of the pulse of the initial PWM signal SPWM', wherein the pulse omission reference signal VPSM is correlated with the above-mentioned current threshold.

Please still refer to FIG. 5 in conjugation with FIG. 7. In one embodiment, the AND gate 621 generates a trigger signal STG according to a clock signal CLK and an inverted-phase signal SPWM1 of the adjusted PWM signal SPWM. The LFSR 622 triggers the random control signal SRDM according to the trigger signal STG. In one embodiment, the ramp signal VRAMP is generated further according to the clock signal CLK, so that the switching frequency of the initial PWM signal SPWM' is controlled by the clock signal CLK and so that the initial PWM signal SPWM' is synchronous with the clock signal CLK. In one embodiment, the adjustable current source circuit 407 includes a resistor R1, a resistor RS, a bias current source Ib, plural adjustment current sources (I1, I2, I3, . . . In) and plural adjustment switches (SW1, SW2, SW3, . . . SWn) coupled in correspondence to the adjustment current sources (I1, I2, I3, . . . In), wherein the adjustment current sources (I1, I2, I3, . . . In) have a same weighting or different weightings (i.e., they generate the same current or different amount of currents). The adjustment switches (SW1, SW2, SW3, . . . SWn) randomly switch according to the random control signal SRDM, so that the adjustment current sources (I1, I2, I3, . . . In) generate a random current Ir1. In this embodiment, the adjustable current source circuit 407 randomly adjusts the level of the pulse omission reference signal VPSM via the random current Ir1, thus randomly adjusting the pulse width of the omission pulse of the pulse omission control signal dPSM.

Figure 8:
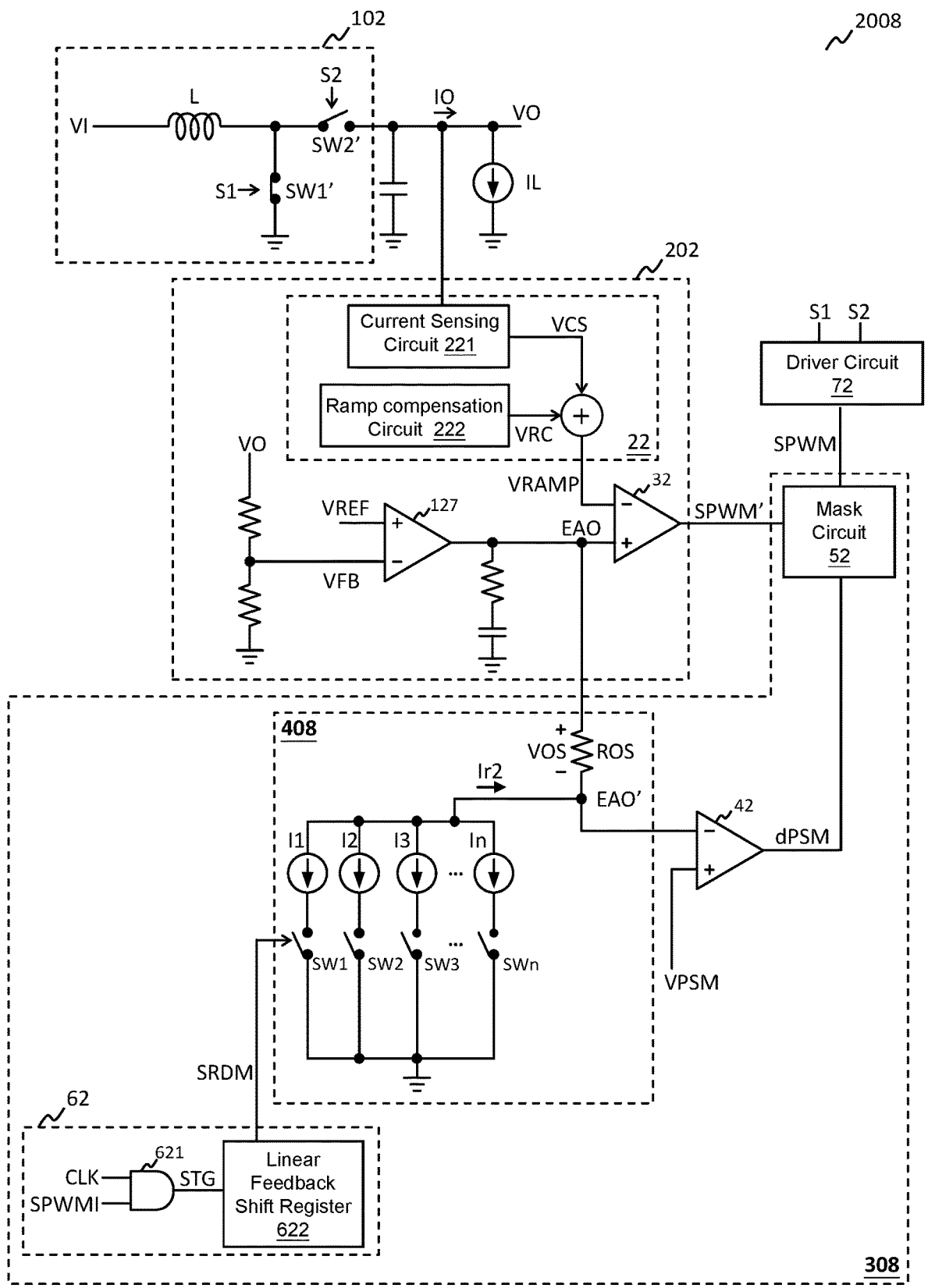
FIG. 8 shows a schematic diagram of a spread spectrum switching converter according to a specific embodiment of the present invention.

Please refer to FIG. 8, which shows a schematic diagram of a spread spectrum switching converter (i.e., spread spectrum switching converter 2008) according to a specific embodiment of the present invention. The spread spectrum switching converter 2008 of this embodiment shown in FIG. 8 is similar to the spread spectrum switching converter 2007 of the embodiment shown in FIG. 7, but is different in that, in this embodiment, an adjustable current source circuit 408 of a pulse omission control circuit 308 serves to randomly adjust the level of the error amplification signal EAO according to the random control signal SRDM, to generate an adjusted error amplification signal EAO'. In one embodiment, the adjustable current source circuit 408 includes: a resistor ROS, plural adjustment current sources (I1, I2, I3, . . . In) and plural adjustment switches (SW1, SW2, SW3, . . . SWn) coupled in correspondence to the plural adjustment current sources (I1, I2, I3, . . . In), wherein there is a voltage VOS across the resistor ROS, and wherein the adjustment current sources (I1, I2, I3, . . . In) have a same weighting or different weightings (i.e., they generate the same current or different amount of currents). The adjustment switches (SW1, SW2, SW3, . . . SWn) randomly switch according to the random control signal SRDM, SO that the adjustment current sources (I1, I2, I3, . . . In) generate a random current Ir2. In this embodiment, the adjustable current source circuit 408 randomly adjusts the level of the error amplification signal EAO via the random current Ir2, to generate the adjusted error amplification signal EAO', thus randomly adjusting the pulse width of the omission pulse of the pulse omission control signal dPSM.

Figure 9:
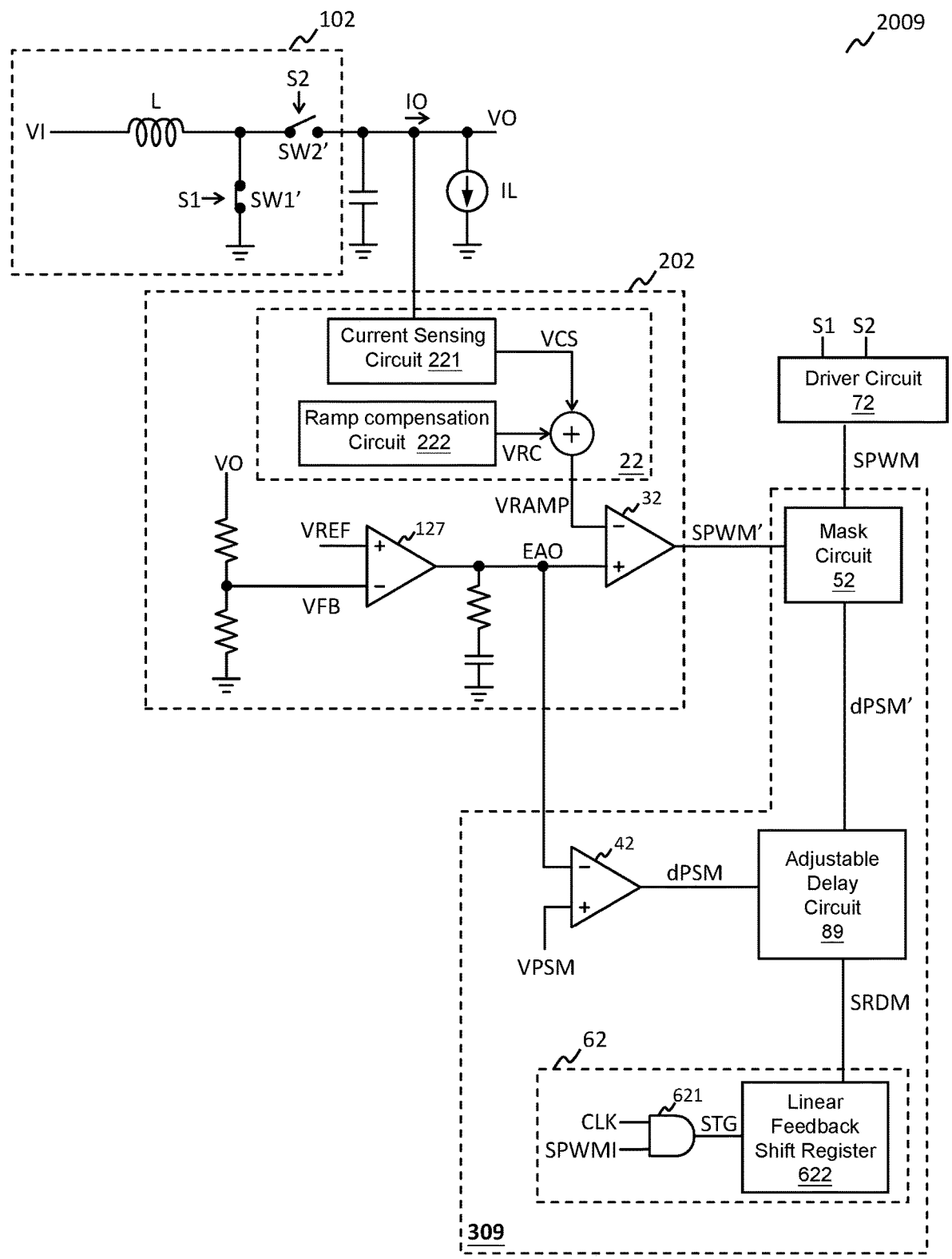
FIG. 9 shows a schematic diagram of a spread spectrum switching converter according to a specific embodiment of the present invention.
Figure 10A:
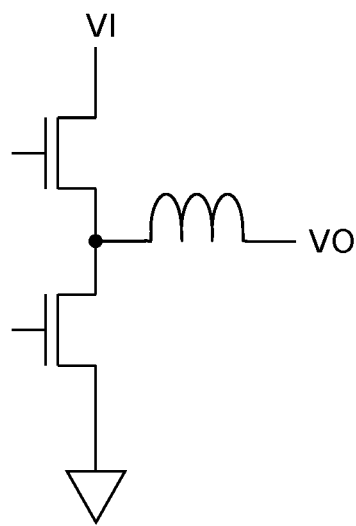
FIG. 10A to FIG. 10L show plural embodiments of a power stage circuit of a spread spectrum switching converter of the present invention
Figure 10B:
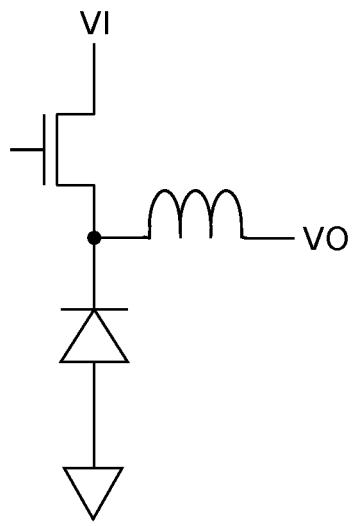
Figure 10C:
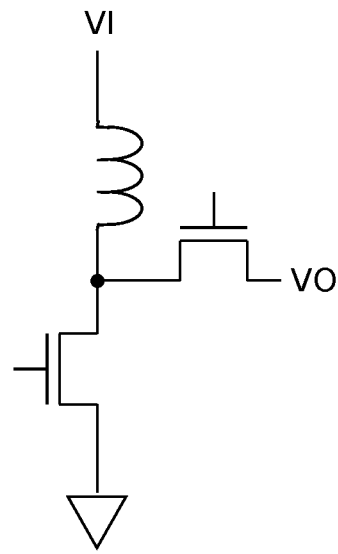
Figure 10D:
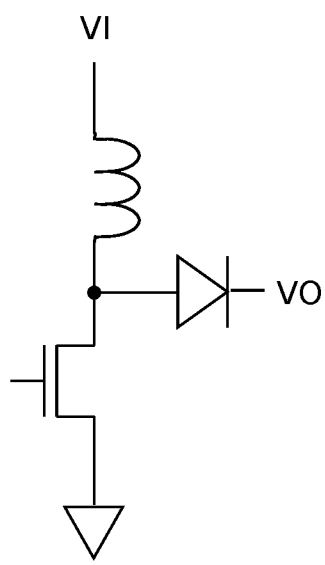
Figure 10E:
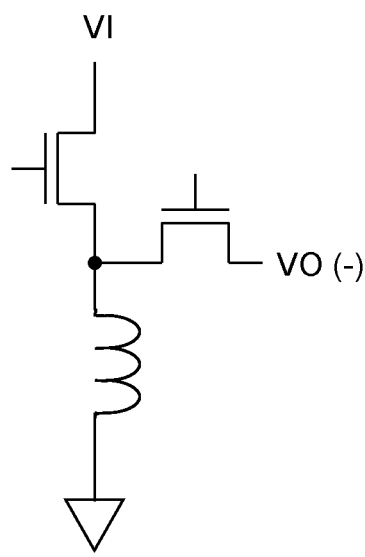
Figure 10F:
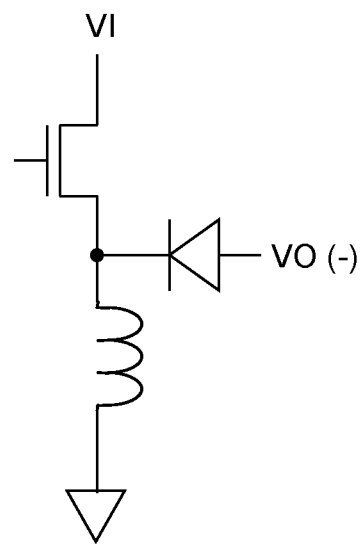
Figure 10G:
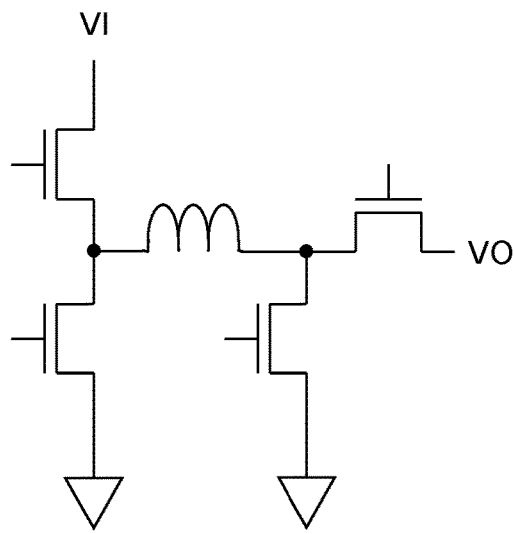
Figure 10H:
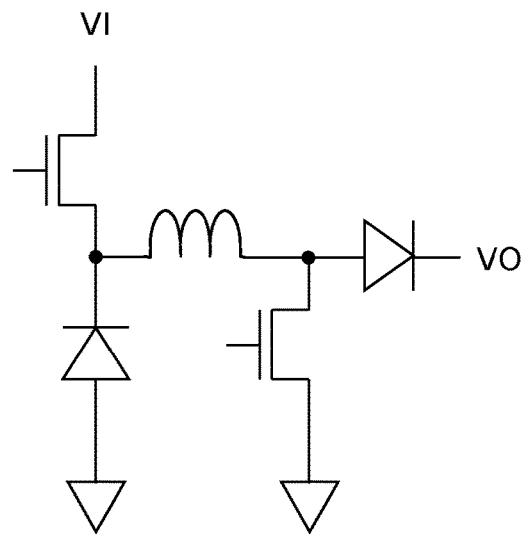
Figure 10I:
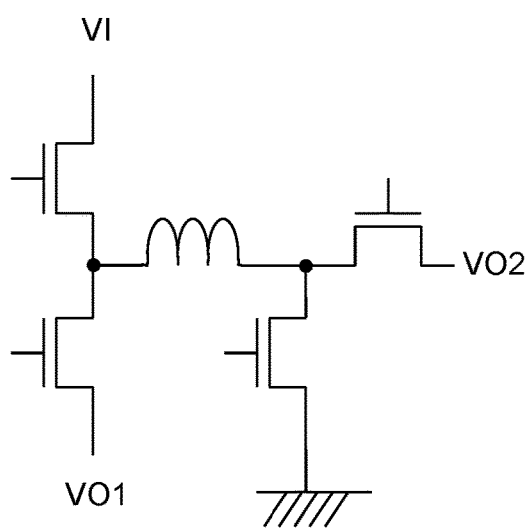
Figure 10J:
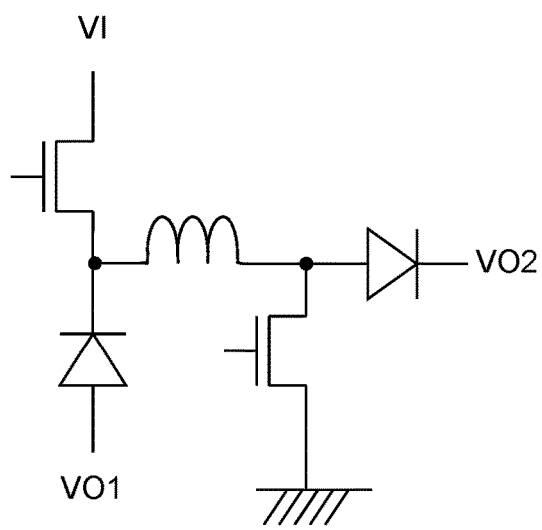
Figure 10K:
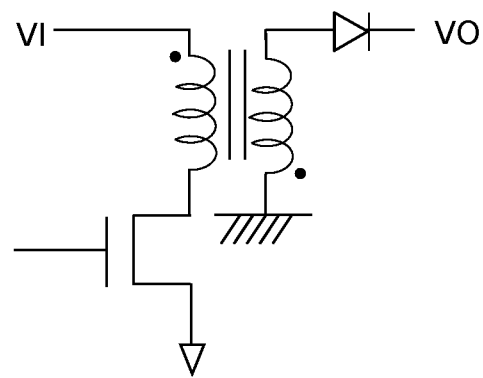
Figure 10L:
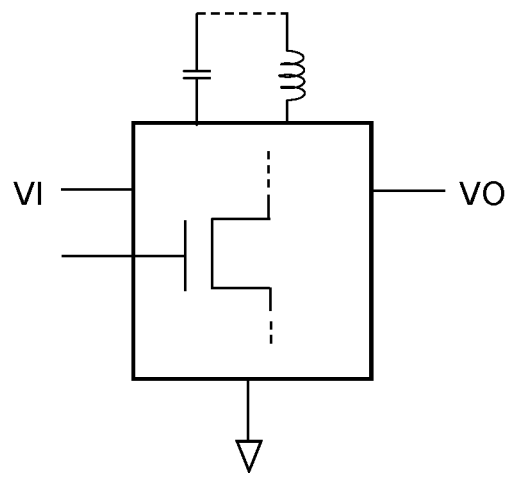

Please refer to FIG. 9, which shows a schematic diagram of a spread spectrum switching converter (i.e., spread spectrum switching converter 2009) according to a specific embodiment of the present invention. The pulse omission control circuit 309 of the spread spectrum switching converter 2009 shown in FIG. 9 is similar to the pulse omission control circuit 304 of the spread spectrum switching converter 2004 shown in FIG. 4, but is more specific in that, in this embodiment of FIG. 9, the random signal generation circuit 62 of the pulse omission control circuit 309 further includes the AND gate 621 and the LFSR 622. The AND gate 621 generates a trigger signal STG according to a clock signal CLK and an inverted-phase signal SPWM1 of an adjusted PWM signal SPWM. The LFSR 622 triggers the random control signal SRDM according to the trigger signal STG. The adjustable delay circuit 84 is configured to randomly adjust the adjustable delay time according to the random control signal SRDM, so as to randomly adjust the pulse width of the pulse omission control signal dPSM, thus generating the adjusted pulse omission control signal dPSM'.

Please refer to FIG. 10A to FIG. 10L, which show plural embodiments of a power stage circuit of a spread spectrum switching converter of the present invention. The power stage circuit includes at least one switch and an inductor which are coupled to each other, wherein the at least one switch operates the inductor according to the control signal, to convert the input power to the output power. As shown in FIG. 10A to FIG. 10L, the power stage circuit includes, for example but not limited to, a boost converter power stage circuit, a buck converter power stage circuit, a buck-boost converter power stage circuit or a switched tank converter (STC) power stage circuit.

In one embodiment, the power stage circuit includes the above-mentioned boost converter power stage circuit, wherein the inverted-phase signal is generated by executing an inverted-phase operation on the adjusted PWM signal SPWM, and wherein the adjusted PWM signal SPWM is configured to operably generate the control signal for operating an upper gate switch of the at least one switch.

It is worthwhile mentioning that, the spread spectrum switching converter of the present invention is advantageous in that: in a light load operation state, the spread spectrum switching converter of the present invention can randomly adjust the error amplification signal EAO, the pulse omission reference signal VPSM or a delay time of the pulse omission control signal dPSM, so as to randomly adjust the pulse width of the pulse omission control signal dPSM, such that a frequency spectrum of the adjusted PWM signal SPWM and a frequency spectrum of the output power VO both have a spread spectrum characteristic to thereby prevent negative issues of the noise interference, the electromagnetic interference (EMI) and the electromagnetic radiation (EMR) from affecting the load IL coupled to the output power VO. Besides, because the present invention performs random adjustment according to an inverted-phase signal SPWM1 of the adjusted PWM signal SPWM, the adjusted PWM signal SPWM is not subject to interferences.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A spread spectrum switching converter, which is configured to operably switch at least one switch thereof according to a control signal, so as to convert an input power to an output power; the spread spectrum switching converter comprising:
a pulse width modulation (PWM) circuit, which is configured to operably generate an initial PWM signal according to a feedback signal related to the output power by performing pulse width modulation; and
a pulse omission control circuit, which is configured to operably generate a pulse omission control signal, wherein pulses of the initial PWM signal are masked during a pulse width of the pulse omission control signal, thus generating an adjusted PWM signal to thereby generate the control signal, wherein the pulse width of the pulse omission control signal is adjusted to vary randomly based on a random control signal, so as to randomly vary a range of the pulses being masked in the initial PWM signal, such that the adjusted PWM signal exhibits a spread spectrum characteristic.

2. The spread spectrum switching converter of claim 1, wherein the pulse omission control circuit includes:
a comparator, which is configured to operably compare an error amplification signal with a pulse omission reference signal to generate the pulse omission control signal, wherein the error amplification signal is generated by an error amplification circuit according to the feedback signal and wherein the initial PWM signal is generated according to the error amplification signal;
wherein the random control signal is configured to randomly adjust a level of the error amplification signal, a level of the pulse omission reference signal or a delay time of the pulse omission control signal, so as to randomly adjust the pulse width of the pulse omission control signal.

3. The spread spectrum switching converter of claim 2, wherein the level of the error amplification signal is correlated with an output current of the output power, wherein when the output current is lower than a current threshold, the pulse omission control signal starts generating an omission pulse for masking the portion of the pulses of the initial PWM signal, wherein the pulse omission reference signal is correlated with the current threshold.

4. The spread spectrum switching converter of claim 3, wherein the PWM circuit is configured to operably compare a ramp signal with the error amplification signal, so as to generate the initial PWM signal, wherein the ramp signal is generated according to the output current.

5. The spread spectrum switching converter of claim 2, wherein the pulse omission control circuit further includes:
a random signal generation circuit, which is configured to operably trigger the random control signal according to an inverted-phase signal of the adjusted PWM signal.

6. The spread spectrum switching converter of claim 5, wherein the random signal generation circuit includes:
a linear feedback shift register (LFSR), which is configured to operably trigger the random control signal according to the inverted-phase signal of the adjusted PWM signal.

7. The spread spectrum switching converter of claim 5, wherein the pulse omission control circuit further includes:
an adjustable current source circuit, which is configured to operably generate a random current according to the random control signal, so as to randomly adjust the level of the error amplification signal or the level of the pulse omission reference signal, thus randomly adjusting the pulse width of the pulse omission control signal.

8. The spread spectrum switching converter of claim 7, wherein the pulse omission control circuit further includes:
an adjustable delay circuit providing an adjustable delay time, wherein the adjustable delay circuit is configured to randomly adjust the adjustable delay time according to the random control signal, so as to randomly adjust the pulse width of the pulse omission control signal.

9. The spread spectrum switching converter of claim 5, further comprising:
a power stage circuit including the at least one switch and an inductor which are coupled to each other, wherein the at least one switch is configured to operate the inductor according to the control signal, to convert the input power to the output power.

10. The spread spectrum switching converter of claim 9, wherein the power stage circuit includes a boost converter, and wherein the inverted-phase signal is generated by executing an inverted-phase operation on the adjusted PWM signal, wherein the adjusted PWM signal is configured to operably generate the control signal for operating an upper gate switch of the at least one switch.

11. The spread spectrum switching converter of claim 1, wherein the output power includes an output current, wherein the pulse omission control circuit is configured to generate the pulse omission control signal based on a comparison of an output current-related signal with a pulse omission reference signal.

12. A spread spectrum control method, which is configured to operably control a spread spectrum switching converter, wherein the spread spectrum switching converter is configured to operably switch at least one switch thereof according to a control signal, to convert an input power to an output power; the spread spectrum control method comprising:
modulating a pulse width according to a feedback signal related to the output power, to generate an initial pulse width modulation (PWM) signal, so as to control the at least one switch to switch an inductor to generate the output power;
generating a pulse omission control signal, wherein pulses of the initial PWM signal are masked during a pulse width of the pulse omission control signal, thus generating an adjusted PWM signal to thereby generate the control signal; and
randomly varying the pulse width of the pulse omission control signal based on a random control signal, so as to randomly vary a range of the pulses being masked in the initial PWM signal, such that the adjusted PWM signal exhibits a spread spectrum characteristic.

13. The spread spectrum control method of claim 12, wherein the step for generating the pulse omission control signal includes:
comparing an error amplification signal with a pulse omission reference signal, so as to generate the pulse omission control signal, wherein the error amplification signal is generated by an error amplification circuit according to the feedback signal and wherein the initial PWM signal is generated according to the error amplification signal;
wherein the random control signal is configured to randomly adjust a level of the error amplification signal, a level of the pulse omission reference signal or a delay time of the pulse omission control signal, so as to randomly adjust the pulse width of the pulse omission control signal.

14. The spread spectrum control method of claim 13, wherein the level of the error amplification signal is correlated with an output current of the output power, wherein when the output current is lower than a current threshold, the pulse omission control signal starts generating an omission pulse for masking the portion of the pulses of the initial PWM signal, and wherein the pulse omission reference signal is correlated with the current threshold.

15. The spread spectrum control method of claim 14, wherein the step for generating the initial PWM signal includes:
comparing a ramp signal with the error amplification signal, so as to generate the initial PWM signal, wherein the ramp signal is generated according to the output current.

16. The spread spectrum control method of claim 13, further comprising:
triggering the random control signal according to an inverted-phase signal of the adjusted PWM signal.

17. The spread spectrum control method of claim 16, wherein the step for randomly adjusting the pulse width of the pulse omission control signal according to a random control signal includes:
generating a random current according to the random control signal, so as to randomly adjust the level of the error amplification signal or the level of the pulse omission reference signal, thus randomly adjusting the pulse width of the pulse omission control signal.

18. The spread spectrum control method of claim 12, wherein the output power includes an output current, wherein the spread spectrum control method comprising: generating the pulse omission control signal based on a comparison of an output current-related signal with a pulse omission reference signal.

* * * * *